United States Patent [19]

Sayle

[11] Patent Number: 4,789,551
[45] Date of Patent: Dec. 6, 1988

[54] SILAGE ADDITIVE

[75] Inventor: Alan Sayle, Gisburn, England

[73] Assignee: B. Dugdale & Son Limited, Lancashire, England

[21] Appl. No.: 64,602

[22] Filed: Jun. 22, 1987

[51] Int. Cl.$^4$ .............................................. A23K 1/00
[52] U.S. Cl. .................................... 426/54; 426/623; 426/636; 426/807
[58] Field of Search ................... 426/53, 54, 635, 807, 426/636, 658, 623

[56] References Cited

U.S. PATENT DOCUMENTS

| | | | |
|---|---|---|---|
| 2,890,956 | 6/1959 | Bonda | 426/54 |
| 3,368,901 | 2/1968 | Thompson | 426/54 |
| 3,875,304 | 4/1975 | Hunt et al. | 426/54 |
| 3,920,858 | 11/1975 | Morris | 426/54 |
| 4,508,737 | 4/1985 | Forest et al. | 426/54 |

*Primary Examiner*—R. B. Penland
*Attorney, Agent, or Firm*—Wenderoth, Lind & Ponack

[57] ABSTRACT

A composition suitable as an additive to ensile grass in the production of silage comprises a blend of sugar beet pulp, cereal and a source of sugar, preferably molasses, and is in the form of dry, free-flowing particles.

11 Claims, No Drawings

SILAGE ADDITIVE

The present invention relates to a composition which is useful as an additive in the production of silage. It further relates to a method of making silage using the said composition.

The process of silage making on a farm involves cutting the grass crop and then ensiling it, typically in a concrete bunker, during which the grass is allowed to undergo fermentation involving the sugars in the grass and bacterial action. The resultant material is then used to feed livestock during the winter months when little or no fresh grass is available. The quality of silage, in terms of nutritive value to livestock, is largely determined by the state of the grass used. Critical parameters in the silage making process, namely the moisture content and the sugar content of the grass ensiled and the ambinet temperature during the fermentation of the ensiled grass, are determined by the weather conditions existing during the grass growth, the grass cutting and the period of ensilement. Typically, the moisture content of the grass used may vary from 65 to 85%. If the grass to be ensiled is at the wetter end of this range, all the products of the fermentation are diluted and, often, insufficient acid is produced by the fermentation of the grass sugars to complete the ensiling process. Valuable nutrients, such as sugars, proteins, organic acids and some minerals e.g. sodium and potassium may be lost with excess moisture that drains from the ensiled grass. The problem may be made worse by the fact that the sugar content may already be low in the grass crop if there is heavy cloud cover during the weeks prior to cutting.

Various additives have been available prior to the present invention to help alleviate some of the problems that may arise with silage production. These include acids to help the fermentation, bacterial inoculants to increase the beneficial bacterial levels in the ensiled grass and sugar products to increase the sugar levels in the ensiled grass. Unfortunately, none of these materials has been found to be completely successful in overcoming the defects arising from adverse weather conditions prior to and during ensilement. In particular, none of these prior treatments prevent the loss of valuable nutrients with the effluent arising from the use of high moisture content grass.

The present invention provides a composition suitable for use as an additive during silage production from grass which composition comprises a blend of sugar beet pulp, at least one cereal and at least one source of sugar which composition is in the form of dry, free-flowing particles.

The composition of the invention, as stated above, contains sugar beet pulp as an essential component of the blend. In general, the sugar beet pulp will be present in the blend in an amount of at least 30% by weight based on the total dry weight of the blend, in order that the composition of the invention is capable of absorbing a reasonable amount of moisture from the ensiled grass. It is possible to incorporate the sugar beet pulp into the blend in an amount of upto 99% by weight of the total dry weight of the blend and still obtain a composition that produces benefits when used as a silage additive. However, such a high sugar beet pulp content is not preferred since the benefits resulting from the other components in the blend are correspondingly diminished. In view of the good results we have obtained, we prefer to use sugar beet pulp in an amount of from 70 to 85% by weight based on the total dry weight of the blend. Typically, the sugar beet pulp used will be unmolassed sugar beet pulp.

The composition of the invention also contains, as an essential ingredient, at least one cereal. The type of cereal used is not critical to the working of the invention. Of the various cereals that can be used we mention here, by way of example, wheat and barley. It will, in general, be beneficial to crush or coarsely grind the cereal grains prior to incorporation into the blend. Alternatively, the cereal grains may be crushed or groud during blending with the other components. The cereal content of the blend will, in general, be less than 30% by weight based on the total dry weight of the composition. Typically, cereal will be present in the blend in a range of from 10 to 20% by weight based on the total weight of the dry composition.

As the source of sugar incorporated into the blend, we prefer to use molasses in view of the fact that it is easily and cheaply available. However, sugar sources, such as by-products of the sugar or starch industries other than molasses, are also suitable for use in the invention. Typically, the amount of sugar source incorporated into the blend will be in the range of from 5 to 15%, preferably 5 to 10%, by weight based on the total weight of the composition.

In accordance with the above, in a preferred embodiment the composition of the invention comprises a blend of from 70 to 85% by weight of unmolassed sugar beet pulp, from 10 to 20% by weight coarsely ground cereal grain and from 5 to 10% by weight of molasses, the % weights being on the basis of the total dry weight of the composition.

In addition to the materials discussed above, the composition of the invention may advantageously contain one or more other ingredients. For instance, it is within the scope of the present invention that part of the sugar beet pulp is replaced by citrus pulp. The composition may also contain one or more substances such as minerals, enzymes, probiotics inoculants, preservatives or acid salts to improve properties of the product silage, for example, the nutritional value to livestock, and/or to aid the numerous chemical reactions that occur during the fermentation of the ensiled grass. The term "minerals", as used herein, includes major essential minerals for livestock (e.g. calcium, phosphorus, potassium and magnesium) and also minor essential minerals for livestock (e.g. manganese, copper, zinc, selenium and molybdenum). The "minor" essential minerals are those that are required by livestock in much smaller quantities than the so-called "major" minerals. Typically, the total amount of minerals, when included in the composition of the invention, will be in the range of from 4 to 5% by weight based on the total weight of the composition. Enzymes, by which we mean proteinaceous substances produced by living cells which, in the presence of other substances, act as catalysts may be incorporated in the composition as an aid to grass conservation. When used, the enzymes will be used in accordance with the manufacturers instructions. A typical amount would be about 0.5% by weight based on the total weight of the composition. The terms "probiotics" and "inoculants", as used above, refer to beneficial bacteria and other microorganisms. These may, in the main, be incorporated into the composition to aid in the best conservation of grass. Examples of such microorganisms include *Streptococcus faecium* and *Lactobacillus*

*acidophilus.* When used, probiotic and/or inoculant substances would be used in accordance with the manufacturers instructions. Typically the total amount of probiotic and/or inoculant will be about 0.5% by weight. Preservatives, by which we mean chemical substances added to improve the grass silage and to minimise spoilage, may also be incorporated into the composition of the invention. Examples of suitable preservatives include formic acid and formalin. Very similar in function to preservatives are acid salts, for example sodium metabisulphate, which may be incorporated into the composition to create further acid conditions to aid silage making.

The composition of the invention is produced by coarsely grinding and mixing the ingredients together to give a moist blend and then forming the mixture into granules or pellets according to known techniques, followed by drying. Preferably, the moist blend of ingredients is extruded through a pellet press, cut into pieces and then dried to give a storage-stable, free-flowing dust-free, dry pelleted materials that is convenient to use as an additive at the time of ensiling the grass crop for silage production. The finished physical form of the product enables it to be handled and applied evenly throughout the grass for ensiling through a standard fertilizer spreader. Even fermentation and maximum efluent retention can then be achieved. It is a further advantage that the pelleted material is also highly suitable for feeding direct to livestock.

The pelleted composition added evenly to the grass at the time of ensiling has the beneficial effect that it is capable of absorbing upto six times its own weight in moisture. Thus, any excess moisture that would previously have drained from the ensiled material and any nutrients and other substances that would previously have been lost through drainage of the excess moisture are retained by the pelletted composition added to the ensiled grass. Furthermore, the molasses present in the composition provides a sugar content which is available for fermentation. Thus, the overall effect of the use of the composition of the invention during silage making is that it allows the production of a winter feed material having improved quality and quantity than previously possible.

It will be clear from the above that the application of any amount of the composition of the invention to the grass at ensiling will improve the properties of the resulting silage, especially the nutritive value to livestock. However, it will further be clear that the moisture content of the grass used for silage making will determine how much of the composition of the invention should be used to achieve the major benefits described above. We have found that extremely good results are obtained using the amounts set out in the table below.

| % DRY MATTER OF GRASS ENSILED | AMOUNT OF PELLETTED COMPOSITION OF THE INVENTION (USING THE COMPOSITION DESCRIBED IN EXAMPLE 1) |
| --- | --- |
| 26% | 15 Kg per 1000 Kg grass |
| 24% | 20 Kg per 1000 Kg grass |
| 22% | 25 Kg per 1000 Kg grass |
| 20% | 30 Kg per 1000 Kg grass |
| 18% | 35 Kg per 1000 Kg grass |
| 16% | 45 Kg per 1000 Kg grass |

EXAMPLE 1

A blend of 72% by weight unmolassed sugar beet pulp, 18% by weight wheat and 10% by weight molasses was prepared by mixing and coarsely grinding the ingredients together. The blend was then extruded through a 4 mm pellet press, cut and dried to give dry, free-flowing, dust-free pellets.

This material was added in an amount of 25 kg per 1000 kg of grass (22% D.M.) and the results obtained compared to the results obtained with no addition are shown in the following Table.

| | | |
| --- | --- | --- |
| GRASS ENSILED (22% D.M.) | 1000 KG | 1000 KG |
| PELLETTED COMPOSITION (ACCORDING TO INVENTION) | — | 25 KG |
| EFFLUENT PRODUCED | 75 KG | — |
| ENSILED FEED | 925 KG | 1025 KG |
| ENSILED FEED (D.M.) | 215 KG | 242 KG. |

EXAMPLE 2

A blend of 70% by weight unmolassed sugar beet pulp, 16% by weight wheat, 8% by weight of molasses, 3–4% by weight magnesium phosphate, 1% by weight of trace minerals (comprising manganese, copper, zinc, selenium and molybdenum), 0.5% by weight enzymes and 0.5% by weight probiotics was prepared by mixing and coarsely grinding the ingredients together. The blend was then extruded, as in Example 1 to give a dry, free-flowing, dust-free pelleted silage additive.

I claim:

1. A composition suitable for use as a supplement during silage production from grass consisting essentially of a blend of 70–85% unmolassed sugar beet pulp, 10–20% cereal and 5–10% molasses, all percentages being by weight based on the weight of the composition, said composition being the the form of dry, free-flowing particles.

2. A composition according to claim 1 comprising a blend of 72% by weight unmolassed sugar beet pulp, 18% by weight wheat and 10% by weight molasses, all percentages being based on the total weight of the composition.

3. A composition according to claim 1 which additionally comprises one or more substances selected from the group consisting of minerals, enzymes, probiotics, inoculants, preservatives and acid salts.

4. A composition according to claim 2 which additionally comprises one or more substances selected from the group consisting of minerals, enzymes, probiotics, inoculants, preservatives and acid salts.

5. A method of making a composition suitable for use as a supplement during silage production comprising blending together from 70–85% by weight unmolassed sugar beet pulp, from 10–20% by weight cereal and from 5–10% molasses, all percentages being based on the total weight of the composition, to form a moist blend, forming the moist blend into granules and then drying the granules.

6. A method of making a composition suitable for use as a supplement during silage production comprising blending together from 70–85% by weight unmolassed sugar beet pulp, from 10–20% by weight cereal and from 5–10% molasses, all percentages being based on the total weight of the composition, to form a moist blend, extruding the moist blend through a pellet press, cutting the extruded blend into pellets and then drying the pellets.

7. A method according to claim 5, wherein one or more substances selected from the group consisting of minerals, enzymes, probiotics, inoculants, preservatives and acid salts are incorporated into the blend.

8. A method according to claim 6, wherein one or more substances selected from the group consisting of minerals, enzymes, probiotics, inoculants, preservatives and acid salts are incorporated into the blend.

9. A method of making silage comprising ensiling cut grass and an effective amount of a blend of 70–85% unmolassed sugar beet pulp, 10–20% cereal and 5–10% molasses all percentages being by weight based on the weight of the blend and fermenting the resulting mass.

10. A method according to claim 9 comprising a blend of 72% by weight unmolassed sugar beet pulp, 18% by weight wheat and 10% by weight molasses, all percentages being based on the total weight of the blend.

11. A method according to claim 9 which additionally comprises one or more substances selected from the group consisting essentially of minerals, enzymes, probiotics, inoculants, preservatives and acid salts.

* * * * *